Aug. 24, 1954
C. G. UMSTED
2,687,043
VARIABLE SPEED MECHANISM
Filed Aug. 17, 1946
2 Sheets-Sheet 1
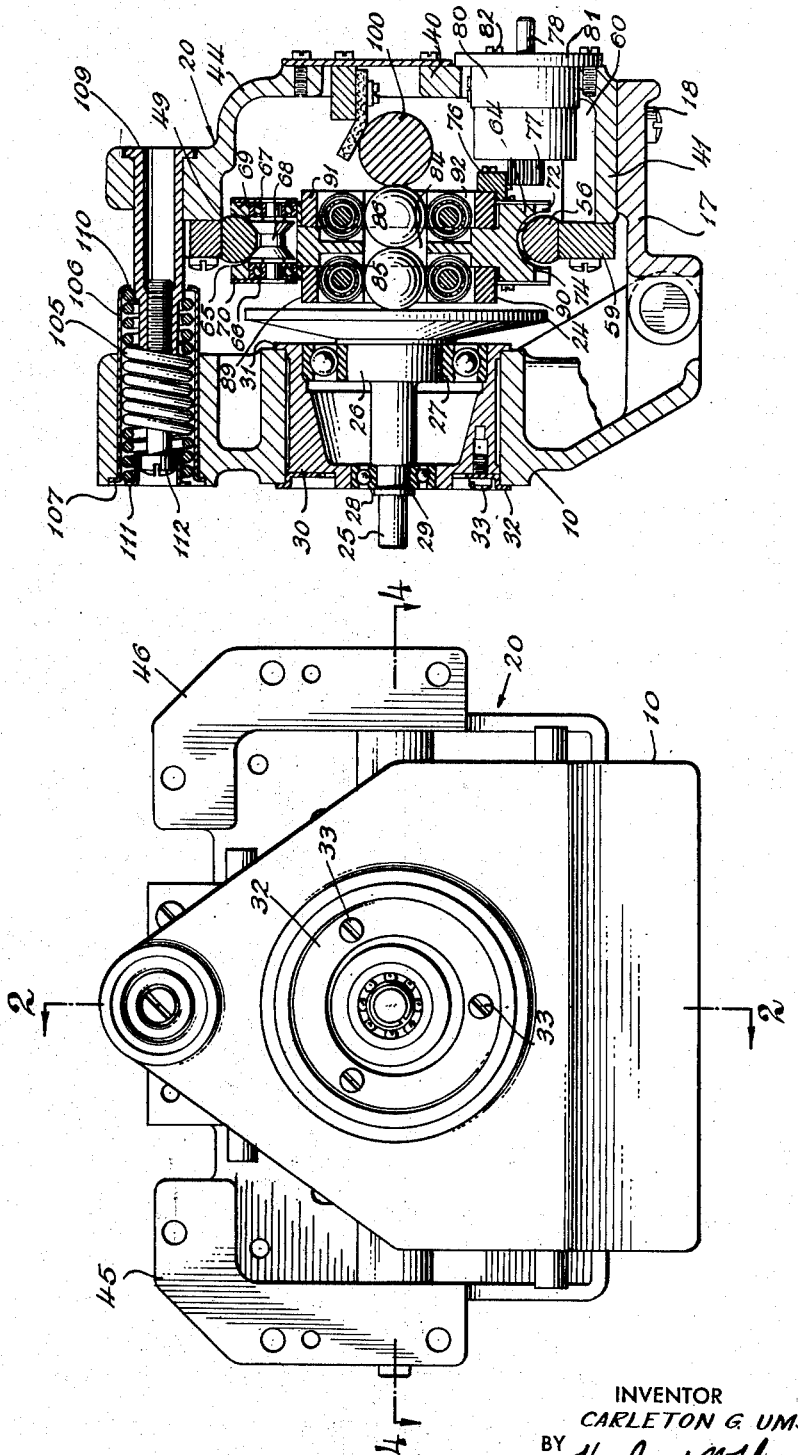
INVENTOR
CARLETON G. UMSTED
BY
Herbert P. Thompson
his ATTORNEY.

Aug. 24, 1954
C. G. UMSTED
2,687,043
VARIABLE SPEED MECHANISM
Filed Aug. 17, 1946
2 Sheets-Sheet 2
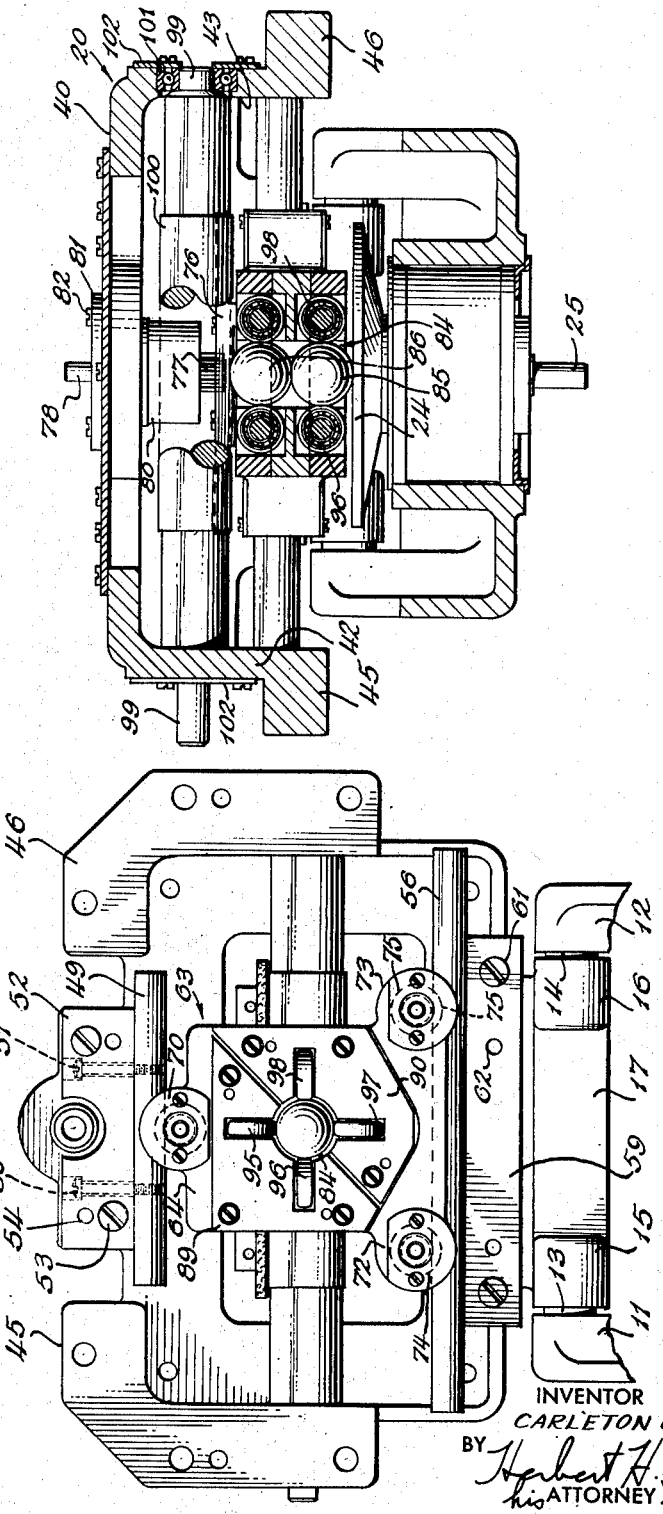
INVENTOR
CARLETON G. UMSTED
BY
his ATTORNEY.

Patented Aug. 24, 1954

2,687,043

UNITED STATES PATENT OFFICE 2,687,043

VARIABLE SPEED MECHANISM

Carleton G. Umsted, Northport, N. Y., assignor to The Sperry Corporation, a corporation of Delaware Application August 17, 1946, Serial No. 691,310

7 Claims. (Cl. 74—198)

This invention relates to a variable speed mechanism and has for its object the provision of a rugged, accurate, variable speed mechanism operable with a minimum of friction and suitable for assembly in mass production without complicated gauging operations.

Another object of the invention is the provision of a variable speed mechanism so designed that all parts thereof are readily accessible and adjustable with no tools other than a screw driver.

The variable speed mechanism of the present invention is designed primarily for use in gun fire control computers where extreme accuracy is required. At the same time, the device is sufficiently rugged to withstand the effects of nearby gunfire.

The invention contemplates a novel, independently supported and substantially frictionless ball carriage having a two-ball motion transmitting arrangement. The ball carriage is supported by three roller bearings of substantially hourglass shape which are symmetrically arranged with respect to the common axis of the motion transmitting balls, in the form of a triangle. The roller bearings are mounted on ball bearings and ride upon two rather widely spaced half round rails. The respective rollers engage points on opposite sides of the rails. This arrangement provides a three-point substantially frictionless support which maintains the ball carriage in the plane in which it travels independently of other parts of the mechanism, and thereby provides a more freely running assembly, operating with less play and greater accuracy than former structures in which the motion transmitting balls are relied upon, at least to some extent, to reduce carriage friction and stabilize the carriage as it is adjusted.

The invention will now be described with the aid of the accompanying drawings, of which:

Fig. 1 is a view in elevation of a variable speed mechanism according to a preferred embodiment of the invention;

Fig. 2 is a vertical section taken through 2—2 of Fig. 1;

Fig. 3 is a view showing the ball carriage and associated parts in elevation; and Fig. 4 is a horizontal section taken through 4—4 of Fig. 1.

The variable speed mechanism comprises two castings, hinged to each other which serve as a framework for the device. The front casting 10 according to Fig. 1 is provided with two spaced lugs 11 and 12 formed thereon which project toward the rear, at the lower part of the casting. The lugs form one part of a hinge and are formed with bearing openings to receive short heavy shafts 13 and 14 of the opposite part of the hinge. These shafts are fixed respectively in lugs 15 and 16 formed on a plate 17 secured by screws, such as screw 18, to the under surface of a second or rear casting 20.

Casting 10 supports a novel rotary disc assembly, the disc 24 and the bearings therefor being assembled in a single readily replaceable unit, and provision is made for adjusting the position of the disc with respect to the casting 10 to take care of irregularities in manufacture.

The disc 24 is formed with a coaxially disposed shaft or spindle 25 having a hub 26 formed thereon immediately adjacent the disc, the hub being very large in proportion to the diameter of the spindle so as to provide adequate support for the disc when the balls of the ball carriage, to be described, are positioned near the edge of the disc.

Hub 26 turns in a ball bearing assembly 27 which serves also as a thrust bearing. Spindle 25 turns in a ball bearing assembly 28. A lock washer 29 is disposed on the spindle alongside bearing assembly 28. Both ball bearing assemblies are supported within a removable bushing 30 which is retained in an opening in casting 10 by a flange 31 formed at one end of the bushing and a second removable flange 32 secured by screws 33 to the opposite end of the bushing. The opening in bushing 30 in which the bearings are supported is formed eccentrically with respect to the outer surface of the bushing. This eccentric offset is quite small but for clarity it is shown in Fig. 1 considerably exaggerated. This eccentric arrangement permits the bushing to be rotated to shift the center of the disc with respect to the balls of the ball carriage so that the balls will pass accurately through the axis of the disc.

A ball carriage and tracks therefor of novel construction are supported by casting 20, together with a cooperating roller.

Referring to Figs. 1 and 2, the casting or framework 20 is formed with a rear wall 40, a bottom wall 41, side walls 42 and 43 and a top wall 44. The top and side walls are formed with forwardly projecting members 45 and 46 having flat surfaces for the purpose of mounting the device on some suitable support.

A round rail 49 having a flat surface on one side is fastened by screws 50 and 51 to a block 52 attached by screws 53 and dowel pins 54 to an enlarged central portion of the top wall 44 in spaced relation with the rear wall 40 of casting 20. A similar but longer rail 56 is attached to a block 59 in the same manner. Block 59 is attached to a thickened portion 60 of the bottom of the casing by screws 61 and dowels 62. The rails are parallel to each other and so mounted as to be parallel to the plane of disc 24 when the latter is in operating position.

The ball carriage 63 rides between the rails. The ball carriage comprises an approximately flat cast framework 64, the outline of which is shown in Fig. 3 in elevation while vertical sections and transverse sections thereof are shown in Figs. 2 and 4, respectively.

A boss 69 formed on the upper surface of framework 64 has a recess 65 formed therein which partly overlaps rail 49 on opposite sides thereof. Bearings 66 and 67, disposed in openings in the boss on opposite sides of the recess, support a roller 68 which rides on rail 49. The central portion of the roller is cut away forming sloping flanges which engage opposite ends of a chord of the curved rail. The bearings are held in their recesses by removable approximately circular cover plates attached to the framework by suitable screws. The cover plate 70 for bearing 66 is shown in Fig. 3.

Bosses 72 and 73, formed at opposite ends of the lower part of framework, have recesses therein which overlap opposite sides of the lower rail 56. Rollers 74 and 75, indicated by dotted lines in Fig. 3, are mounted in the recesses in the respective bosses, the arrangement being the same as for the upper roller 68.

A rack 76, Figs. 2 and 4, is secured to the rear of the carriage. A gear 77 formed on a shaft 78 meshes with the rack, shaft 78 being used to displace the ball carriage in the usual manner. Shaft 78 is mounted in a removable ball bearing unit 80 fitted into an opening in the lower central portion of the rear wall 40 of casting 20 where the unit is secured in position by a ring 81 attached to the casting by screws 82.

A central opening 84 disposed to be brought into register with the center of disc 24 is formed in the framework 64 of the ball carriage. Motion communicating balls 85 and 86 are disposed in opening 84. The opening is somewhat larger than the balls which are held clear of the sides thereof by a novel antifriction roller arrangement which will now be described.

A pair of rather thick approximately triangular plates 89 and 90 are secured side by side by suitable screws to the front part, as shown in Fig. 3, of the casting 64 of the ball carriage, while a similar pair of plates 91 and 92 are secured to the rear thereof. Plates 89 and 90 have adjacent edges formed with complementary semicircular recesses therein which, when the plates are in position, form a circular opening which is in register with the central opening 84 of the framework 64. The rear plates 91 and 92 are shaped in the corresponding manner.

Each plate 89—92 has a pair of slots formed therein at right angles to each other and so located that each slot of one plate is aligned with a corresponding slot of the adjacent plate.

Antifriction rollers 95 and 96 are mounted in the slots of plate 89 which similar rollers 97 and 98 are mounted in the slots of plate 90. The bearings for the respective rollers are offset from the central planes of the respective plates in order that the outer edges of the rollers will be disposed below the outer surfaces of the plates to protect the rather delicate shafts of the rollers from injury. With this arrangement, the rollers project beyond the inner surfaces of their supporting plates but recesses are cut in the central part of the framework 64 into which the projecting portions of the rollers extend whereby the rollers freely revolve in their bearings clear of the framework.

The parts just described are so located that balls 85 and 86 are each supported by a set of four rollers. While all of the parts herein described are intended to be of precision manufacture, some adjustment may be made to compensate for wear, irregularities in manufacture and for easy repair, by slight adjustments in the position of the respective plates 89—92. It is thought that this will be understood from inspection of the drawings.

The balls of the ball carriage cooperate with a roller in the known manner. Shaft 99, which has a roller 100 formed thereon, turns in bearings 101 mounted in suitable openings in the side walls 42 and 43 of casting 20. The openings are large enough to permit the shaft and drum to pass therethrough when either bearing is removed. Rings 102, secured in position by suitable screws, are provided for retaining the bearings 101 in their openings.

The balls 85 and 86 are yieldingly pressed between disc 24 and roller 100 by a spring 105 enclosed within a sleeve 106 having an external flange 107 formed at one end. The sleeve extends through an opening in the upper part of casting 10 where its flange 107 rests on a shoulder formed about the opening. An internally threaded hollow stud 109, secured to casting 20, projects into sleeve 106 clear of the sides thereof. The spring is variably compressed between an internal flange 110 formed on the sleeve and a cap 111 by means of a screw 112 which extends through an opening in the cap and is threaded into the threaded portion of stud 109.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A variable speed mechanism comprising a framework having an opening formed therein, a bushing rotatably disposed in the opening having a bore slightly off center, a disc, a shaft therefor, bearing means for the shaft effective to support the disc against thrust disposed in the bore, a movable ball carriage and roller disposed in the framework cooperating with the disc, and means for securing the bushing against rotation in the opening, the arrangement being such that the bushing may be turned to position the center of the disc with reference to the path of the ball carriage.

2. A variable speed mechanism comprising a framework having an opening formed therein, a bushing rotatably disposed in the opening having a flange formed at one end and a bore slightly off center with respect to the outer surface of the bushing, a disc, a shaft fixed to the disc, bearing means for the shaft disposed in the bore effective to support the disc against thrust, a movable ball carriage and roller disposed in the framework cooperating with the disc, a retaining flange removably attached to the opposite end of the bushing cooperating with the first mentioned flange for securing the bushing in position, the arrangement being such that the disc and the bearing means for the shaft may be installed as a unit in the framework and the axis of the disc may be thereafter adjusted with reference to the path of the ball carriage by rotating the bushing in the opening.

3. A variable speed mechanism comprising a framework having an opening formed therein, a bushing disposed for rotation in the opening having a bore formed slightly off center, a disc, a shaft therefore having a relatively large hub formed thereon adjacent to the disc, an antifriction bearing for the hub disposed in the bore of the bushing for supporting the disc against thrust, particularly thrust exerted thereon at points remote from the center of the disc, a second antifriction bearing for the shaft disposed in the bore, a ball carriage and a cooperating roller disposed in the framework, and means for detachably securing the bushing in the opening, the bushing being adapted to be rotated to position the center of the disc with reference to the path of the ball carriage.

4. A variable speed mechanism comprising a two-part framework, hinge means connecting the parts, a roller and a cooperating ball carriage disposed in one part of the framework, bearing means disposed in the other part of the framework, a disc supported for rotation in the bearing means cooperating with the ball carriage, eccentric means supporting the bearing means for adjusting the position of the center of the disc with reference to the ball carriage, and spring means jointly supported by both parts of the framework for pressing the parts together.

5. A variable speed mechanism comprising a two-part framework, hinge means connecting the parts of the framework, a roller and a cooperating ball carriage disposed in one part of the framework, bearing means disposed in the other part of the framework, a disc supported for rotation in the bearing means cooperating with the ball carriage, and eccentrically formed means for supporting the bearing means for adjusting the position of the disc with reference to the ball carriage.

6. A variable speed mechanism comprising a two-part framework, hinge means connecting the parts of the framework, a roller and a cooperating ball carriage disposed in one part of the framework, a bushing having an eccentrically formed bore disposed in the other part of the framework, bearing means disposed in the bore of the bushing, a disc cooperating with the ball carriage disposed in the bearing means, and means for movably securing the bushing in the framework to adjust the position of the disc with reference to the ball carriage.

7. A variable speed mechanism comprising a two-part framework, a hinge connecting the parts of the framework, a roller and a cooperating ball carriage disposed in one part of the framework, a rotary disc assembly cooperating with the ball carriage disposed in the other part of the framework comprising a spindle for the disc having a relatively large hub formed thereon adjacent the disc, a bushing, ball bearing means in the bushing for the hub adapted to support the disc, particularly the outer portions thereof, against thrust, other ball bearing means in the bushing for the spindle, means for detachably securing the disc assembly as a unit in said other part of the framework, and means responsive to the rotation of the bushing with respect to the frame for adjusting the position of the center of the disc with respect to the ball carriage.

References Cited in the file of this patent

UNITED STATES PATENTS

| Number | Name | Date |
| --- | --- | --- |
| 1,398,417 | Chicken et al. | Nov. 29, 1921 |
| 2,139,234 | Johnson | Dec. 6, 1938 |
| 2,357,035 | Treese et al. | Aug. 29, 1944 |